US007942220B2

(12) United States Patent  (10) Patent No.: US 7,942,220 B2
Dabbs et al.  (45) Date of Patent: May 17, 2011

(54) DIFFERENTIAL STEERING CONTROL FOR A CONTINUOUSLY VARIABLE TRANSMISSION MACHINE

(75) Inventors: Harold D. Dabbs, Godfrey, IL (US); Eric D. Stemler, Peoria, IL (US); Lance M. Cowper, Toluca, IL (US); Richard F. Shults, Tremont, IL (US)

(73) Assignee: Caterpillar Inc., Peoria, IL (US)

( * ) Notice: Subject to any disclaimer, the term of this patent is extended or adjusted under 35 U.S.C. 154(b) by 982 days.

(21) Appl. No.: 11/726,312

(22) Filed: Mar. 21, 2007

(65) Prior Publication Data
US 2008/0153662 A1  Jun. 26, 2008

Related U.S. Application Data

(60) Provisional application No. 60/876,813, filed on Dec. 22, 2006.

(51) Int. Cl.
*B62D 11/00* (2006.01)
(52) U.S. Cl. .................. 180/6.48; 180/6.44; 180/308
(58) Field of Classification Search .................. 180/6.2, 180/6.44, 6.48, 6.5, 6.7, 308
See application file for complete search history.

(56) References Cited

U.S. PATENT DOCUMENTS

| | | |
|---|---|---|
| 4,434,680 A | 3/1984 | Riediger et al. |
| 4,471,669 A | 9/1984 | Seaberg |
| 4,519,275 A | 5/1985 | Maruyama et al. |
| 4,658,927 A | 4/1987 | Kanazawa |
| 4,702,358 A | 10/1987 | Mueller et al. |
| 4,767,382 A | 8/1988 | Tezuka et al. |
| 5,101,919 A | 4/1992 | Ossi |
| 5,307,888 A | 5/1994 | Urvoy |
| 5,388,658 A | 2/1995 | Ando et al. |
| 5,415,596 A | 5/1995 | Zulu |
| 5,473,541 A | 12/1995 | Ishinio et al. |
| 5,477,454 A | 12/1995 | Ishino et al. |
| 5,477,455 A | 12/1995 | Ishino et al. |
| 5,535,840 A | 7/1996 | Ishino et al. |
| 5,611,405 A | 3/1997 | Ishino et al. |
| 5,857,532 A * | 1/1999 | Satzler .......................... 180/6.2 |
| RE36,151 E | 3/1999 | Ishino et al. |
| 6,345,674 B1 * | 2/2002 | Easton ........................ 180/6.44 |
| 6,654,676 B2 * | 11/2003 | Nakagawa et al. ............. 701/50 |

* cited by examiner

*Primary Examiner* — Paul N Dickson
*Assistant Examiner* — Marc A Scharich
(74) *Attorney, Agent, or Firm* — Miller, Matthias & Hull

(57) ABSTRACT

A differential steering control system and method for a machine includes a motor for steering the machine in a leftwards or a rightwards direction, a continuously variable transmission for moving the machine in a forwards or a backwards direction, and a control unit connected to the motor and the continuously variable transmission. The control unit determines the speed of the continuously variable transmission and based upon the determined speed, modifies a speed of the motor in order to achieve/maintain a desired turn radius for the machine.

15 Claims, 3 Drawing Sheets

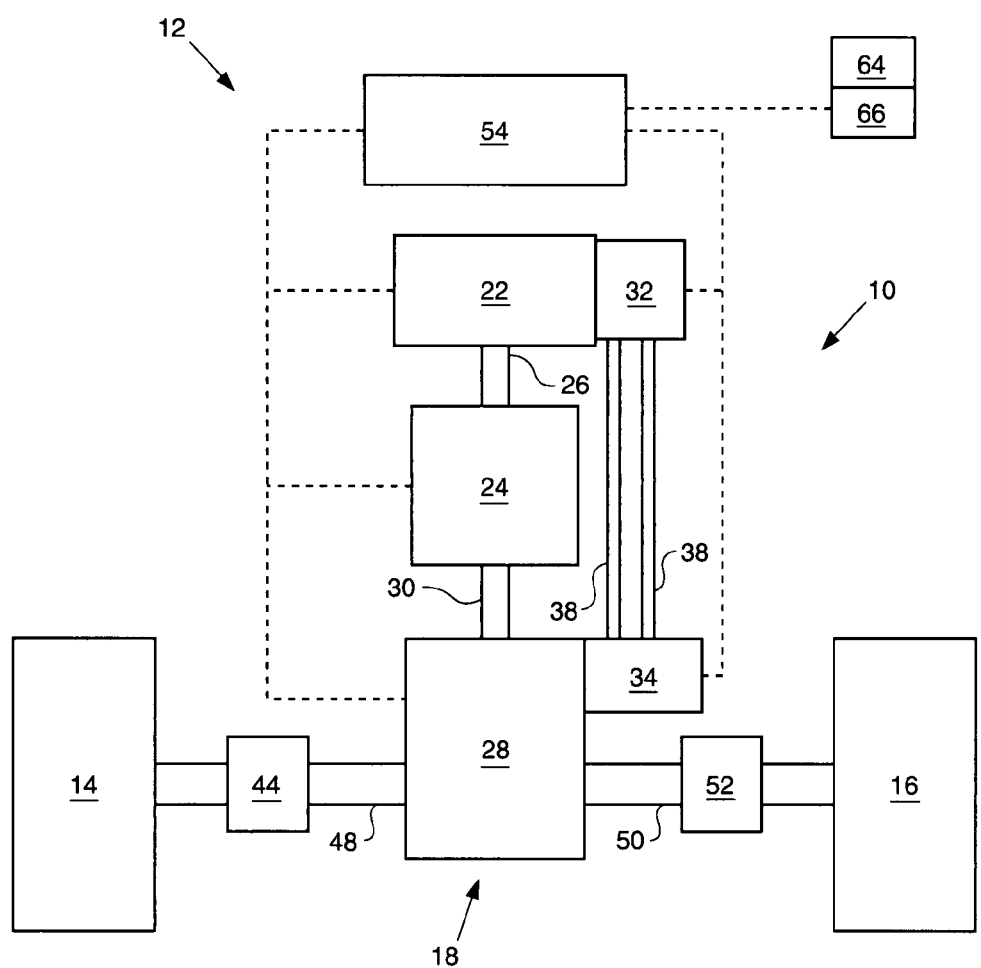
Fig-1-

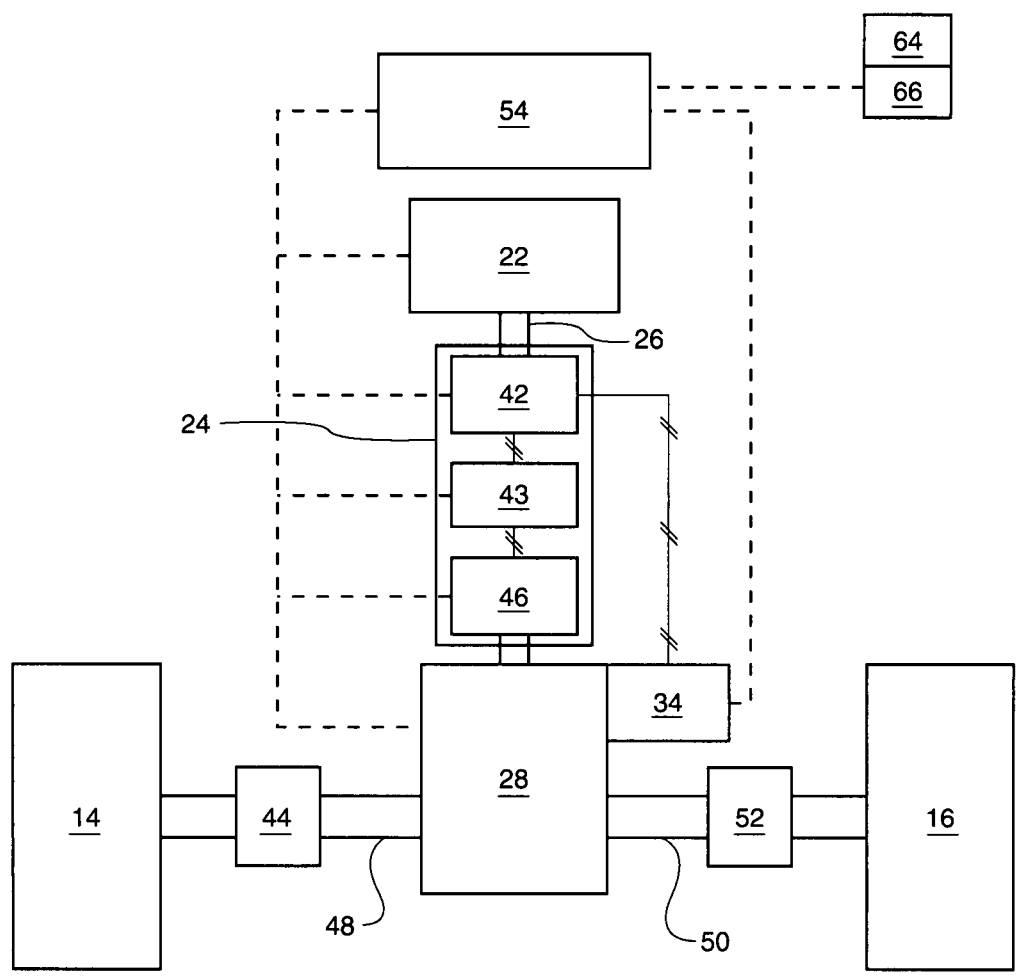

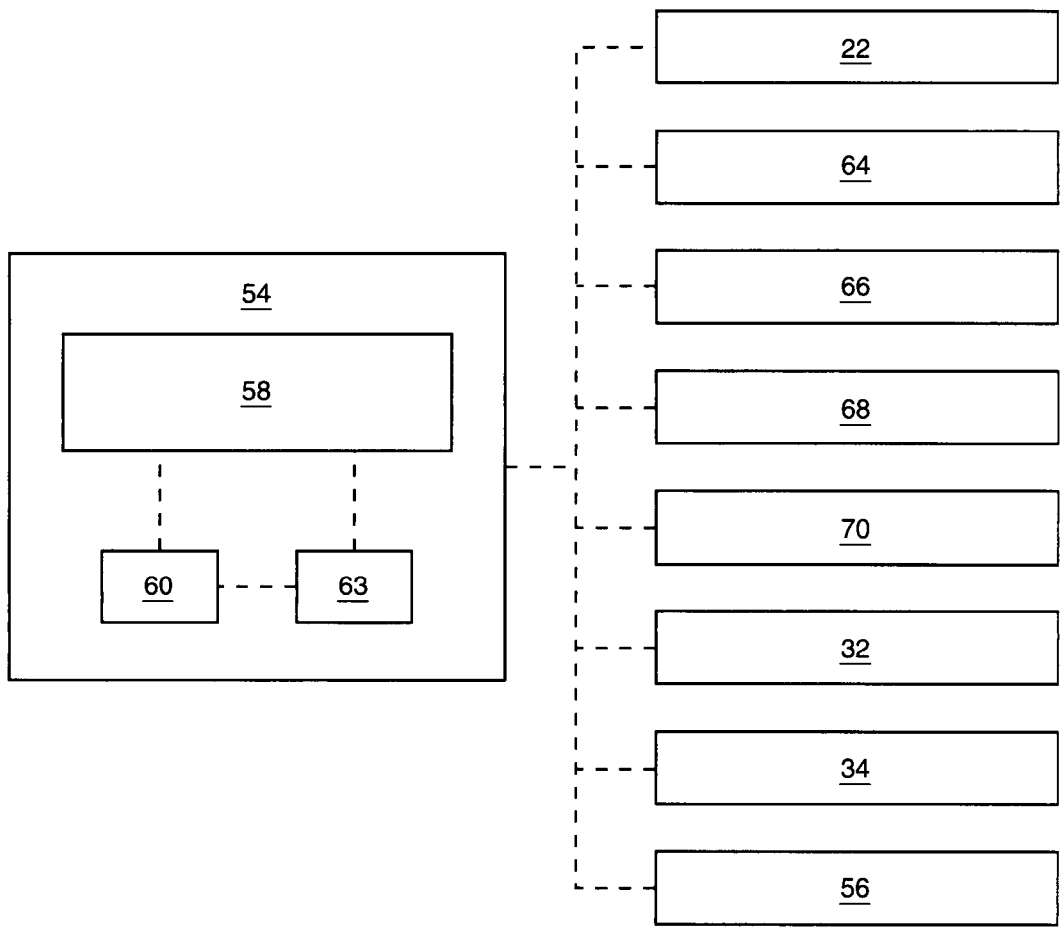

US 7,942,220 B2

DIFFERENTIAL STEERING CONTROL FOR A CONTINUOUSLY VARIABLE TRANSMISSION MACHINE

RELATED APPLICATIONS

This application claims the benefit of U.S. provisional patent application No. 60/876,813, filed Dec. 22, 2006.

TECHNICAL FIELD

This invention relates generally to a steering control system, and more particularly, to a differential steering control for a machine having a continuously variable transmission.

BACKGROUND

Hydro-mechanical steering differential systems are employed in large track-type tractors or machines to provide smooth, equal, and uninterrupted power and torque flow to both the left and the right tracks at all times when the tractor is moving. It is also important to provide power to the tracks whenever the tractor is turning in either the left or right directions. A hydro-mechanical steering differential system is typically powered by a mechanical input and a hydraulic input. The mechanical input is provided from the transmission and the hydraulic input is received from an engine driven variable displacement pump.

In conventional machines, such as a track-laying type of machine, turning control is performed by an operator steering lever or mechanism. However, one problem with the use of such operator steering levers or mechanisms is that it is difficult to have a desired constant turning radius of the machine. For example, it is sometimes difficult to control the machine when attempting to turn with a constant turning radius in a region of low machine speeds or high loads.

U.S. Pat. No. 5,611,405, entitled "Turning Speed Control System for Use in a Track-Laying Vehicle" teaches a turning speed control system. The '405 patent provides a system that reduces vehicle speed in order to achieve a commanded turn radius when the steering motor is rotating at maximum speed.

The '405 patent however, reduces vehicle speed based on turning such that when a turning motor reaches a maximum displacement, and additional turning is demanded but not available, the transmission ratio is reduced. This effect may cause the engine to lug, or increase emissions.

The present disclosure is directed to overcoming one or more of the problems as set forth above.

SUMMARY OF THE INVENTION

In one embodiment, a steering control system for a machine is provided. The steering control system includes a continuously variable transmission, a motor connected to the continuously variable transmission, and a control unit connected to the motor and the continuously variable transmission. The control unit modifies a speed of the motor in response to a change in at least one of a speed of the continuously variable transmission and a load on the engine in order to maintain a desired turn radius.

In another embodiment, a differential steering control system is provided. The differential steering control system includes a motor for steering the machine in a leftwards or a rightwards direction, a continuously variable transmission for moving the machine in a forwards or a backwards direction, a steering device for providing an indication of a desired turn radius, and a control unit connected to the motor, the continuously variable transmission, and the steering device. The control unit determines a speed of the continuously variable transmission and the desired turn radius, and based upon a change in the determined speed and the desired turn radius, the control unit controls a speed of the motor in order to achieve and maintain the desired turn radius.

In yet another embodiment, a method for controlling a differential steering device for a machine having a continuously variable transmission is provided. The differential steering device includes a motor for turning the machine in a leftward or rightward direction. The method includes the steps of determining at least one of a speed of the continuously variable transmission and a load on the engine, determining a desired turn radius, and modifying a speed of the motor based upon the at least one of the determined speed and load to maintain the desired turn radius.

It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated and constitute a part of this specification, illustrate exemplary embodiments of the invention and, together with the description, serve to explain the principles of the invention. In the drawings, FIG. 1 illustrates a schematic view of a machine-level steering differential control system according to one embodiment of the present invention;

FIG. 2 illustrates a schematic view of a machine-level steering differential control system according to another embodiment of the present invention; and FIG. 3 illustrates a schematic view of a steering differential control system according to one embodiment of the present invention.

DETAILED DESCRIPTION

Reference will now be made in detail to embodiments or features of the invention. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment. Whenever possible, the same reference numbers will be used throughout the drawings to refer to the same or like parts.

FIG. 1 illustrates a steering control system 10 incorporated within a machine 12 for providing differential steering to a left traction device 14 such as a wheel, tire, or track, and a right traction device 16, such as a wheel, tire, or track, of a drive train 18. The drive train 18 includes an engine 22 and a continuously variable transmission ("CVT") 24 connected to the engine 22 through a drive shaft 26. The continuously variable transmission 24 may be hydromechanical, electromechanical, or purely electric, including a generator and motor. In the embodiment of FIG. 1, the continuously variable transmission 24 is illustrated as a hydromechanical transmission. Except as otherwise indicated, the CVT 24 will be referred to as a hydromechanical transmission.

The hydromechanical transmission 24 is connected to a steering differential 28 through a shaft 30 to provide a mechanical input thereto. A pump 32 provides hydraulic input to a motor 34 through fluid lines 38 to drive the steering differential 28. The pump 32 may be a reversible, variable displacement type and driven by the engine 22 through a suitable drive connection (not shown in FIG. 1).

Referring to FIGS. 1 and 2 jointly, the steering differential 28 drives the left traction device 14 through a left axle shaft 48, which is coupled to a left final drive 44. The steering differential 28 drives the right traction device 16 through a right axle shaft 50, which is coupled to a right final drive 52. Movement of the machine 12 may be in either the forward or reverse direction and the machine 12 may also be placed in neutral. The machine 12 may be maneuvered to move or turn in either the left or right directions when a relative velocity exists between the left traction device 14 and the right traction device 16.

A control unit 54 monitors and controls the direction and speed of the machine 12 through the hydromechanical transmission 24 and the motor 34. The control unit 54 may be electrically connected to the engine 22, the hydromechanical transmission 24, the pump 32, and the motor 34, as well as additional sensors 56 (see FIG. 3) placed on the left or right traction devices 14, 16, or on the left or right axle 48, 50 to determine speed, direction, errors, temperature, and the like.

FIG. 2 illustrates a CVT 24 embodied as an electric drive train. The electric drive train includes a generator 42, power electronics 43, and an electric motor 46. The electric motor 46 provides propulsion to move the machine 12. In this particular embodiment, the electric motor 46 receives power from the generator 42 or the power electronics 43. The steering motor 34 is also electric.

Referring now to FIG. 3, the control unit 54 includes a microprocessor 58 for executing a specified program, which controls and monitors various functions associated with the machine 12. The microprocessor 58 includes a memory 60, such as ROM (read only memory), for storing a program, and a RAM (random access memory) 63 which serves as a working memory area for use in executing the program stored in the memory 60. Although the microprocessor 58 is shown, it is also possible and contemplated to use other electronic components such as a microcontroller, an ASIC (application specific integrated circuit) chip, or any other integrated circuit device.

The control unit 54 electrically connects to the engine 22, a steering device 64, a direction selector 66, an output speed sensor 68, a differential speed sensor, or sensors, 70, the pump 32, the motor 34, and other speed and temperature type sensors 56. The steering device 64 may be a wheel, joystick, pedals, or the like. The direction selector 66 may be a Forward-Neutral-Reverse ("FNR") device, or the like, and provides desired directional information to the control unit 54. The output speed sensor 68 provides information indicative of an output speed of the hydromechanical transmission 24, and the differential speed sensor 70.

INDUSTRIAL APPLICABILITY

In operation, the hydromechanical transmission 24 provides propulsive power to the driven elements, 14, 16. The steering device 64 provides a signal to the control unit 54 indicative of an operator's desire to turn to the left or to the right at a desired turn radius. The control unit 54 commands an up-stroking or a de-stroking of the pump 32 to increase or decrease the speed of the motor 34. Alternatively, the control unit 54 may command additional power supply to increase the speed of the motor 34 if it is an electric motor.

The motor 34 either increases or decreases a rotational speed of either of the left or right axle shafts 48, 50 to create a relative speed there between. In effect, the left or right final drives 44, 52 increase or decrease to create a relative speed between the two to effect a turning action.

At high or low machine speeds, the turn radius of the machine 12 is achieved by one or both of a reduction in the speed of the hydromechanical transmission 24 and increasing the speed of the motor 34. At higher machine speeds, the speed of the motor 34 is changed to achieve a commanded turn radius. However, at slower machine speeds, the speeds of the motor 34 and the hydromechanical transmission 24 may be changed to achieve the commanded turn radius. If the speed of the hydromechanical transmission 24 is reduced because of external loads, then control unit 54 may reduce the speed of the motor 34 to maintain the commanded turn radius.

As the machine 12 begins turning, the control unit 54 receives information from the steering device 64, the engine 22, the pump 32, the motor 34, the hydromechanical transmission 24, and other speed sensors. The hydromechanical transmission 24 includes logic controls for controlling the input/output ratio and automatically adjusts according to a desired engine running speed. As a result, when a load causes the engine to lug below the desired engine running speed, the hydromechanical transmission input/output ratio adjusts to modify the input/output ratio such that the engine speed increases to a desirable level. However, as the hydromechanical transmission 24 changes ratio to maintain engine speed, the steering system commands less steering speed to maintain the desired turn radius. Accordingly, the motor 34 decreases speed a corresponding amount to maintain the desired turn radius. If the motor 34 is already operating at a maximum speed, the control unit 54 commands the continuously variable transmission to decrease transmission ratio. In effect, the vehicle 12 slows, which results in a decreased turn radius.

It will be apparent to those skilled in the art that various modifications and variations can be made in the disclosed system and method without departing from the scope or spirit of the invention. Other embodiments of the invention will be apparent to those skilled in the art from consideration of the specification and practice of the invention disclosed herein. It is intended that the specification and examples be considered as exemplary only.

What is claimed is:

1. A steering control system for a machine having an engine, comprising: a continuously variable transmission;
   a motor for steering the machine in a leftwards or a rightwards direction; and
   a control unit connected to the engine, the motor and the continuously variable transmission and configured to modify a speed of the motor in response to a change in at least one of a speed of the continuously variable transmission or a load on the engine or both in order to maintain a desired turn radius of the machine.

2. The steering control system according to claim 1, further comprising a sensor associated with the continuously variable transmission for sensing the speed of the continuously variable transmission and for providing the sensed speed to the control unit.

3. The steering control system according to claim 2, further comprising a sensor associated with the motor for sensing the speed of the motor and for providing the sensed speed to the control unit.

4. The steering control system according to claim 1, further comprising a hydraulic pump for hydraulically driving the motor and wherein the continuously variable transmission is a hydromechanical continuously variable transmission.

5. The steering control system according to claim 1, wherein the continuously variable transmission is electromechanical having an electric motor outputting into the transmission.

6. The steering control system according to claim 1, wherein the continuously variable transmission includes a generator connected to the engine and an electric motor electrically connected to the generator, and wherein the electric motor provides propulsion to move the machine in a forward or reverse direction.

7. The steering control system according to claim 1, wherein the motor is adapted to modify an output of the continuously variable transmission to achieve the desired turn radius.

8. The steering control system according to claim 1, wherein when the load on the engine exceeds a predetermined amount, the continuously variable transmission reduces transmission ratio and the motor changes speed a corresponding amount.

9. A differential steering control system for a machine comprising:
a motor for steering the machine in a leftwards or a rightwards direction;
a continuously variable transmission for moving the machine in a forwards or a backwards direction;
a steering device for providing an indication of a desired turn radius; and
a control unit connected to the motor, the continuously variable transmission, and the steering device, wherein the control unit determines a speed of the continuously variable transmission and the desired turn radius, and based upon the determined speed of the continuously variable transmission and the desired turn radius, the control unit controls a speed of the motor in order to achieve and maintain the desired turn radius.

10. The differential steering control system according to claim 9, further comprising a sensor associated with the continuously variable transmission for sensing the speed of the continuously variable transmission and for providing the sensed speed to the control unit.

11. The differential steering control system according to claim 9, further comprising a sensor associated with the motor for sensing the speed of the motor and for providing the sensed speed to the control unit.

12. The differential steering control system according to claim 9, further comprising a hydraulic pump for hydraulically driving the motor and wherein the continuously variable transmission is hydromechanical continuously variable transmission.

13. The differential steering control system according to claim 9, wherein the continuously variable transmission is electromechanical having an electric motor outputting into the transmission.

14. The differential steering control system according to claim 9, wherein the continuously variable transmission includes a generator connected to an engine and an electric motor electrically connected to the generator, and wherein the electric motor provides propulsion to move the machine in the forwards or backwards direction.

15. The differential steering control system according to claim 9, wherein when the motor is operating at a maximum speed and a decreased turn radius is desired, the control unit modifies a ratio of the continuously variable transmission.

\* \* \* \* \*